Figure 1:
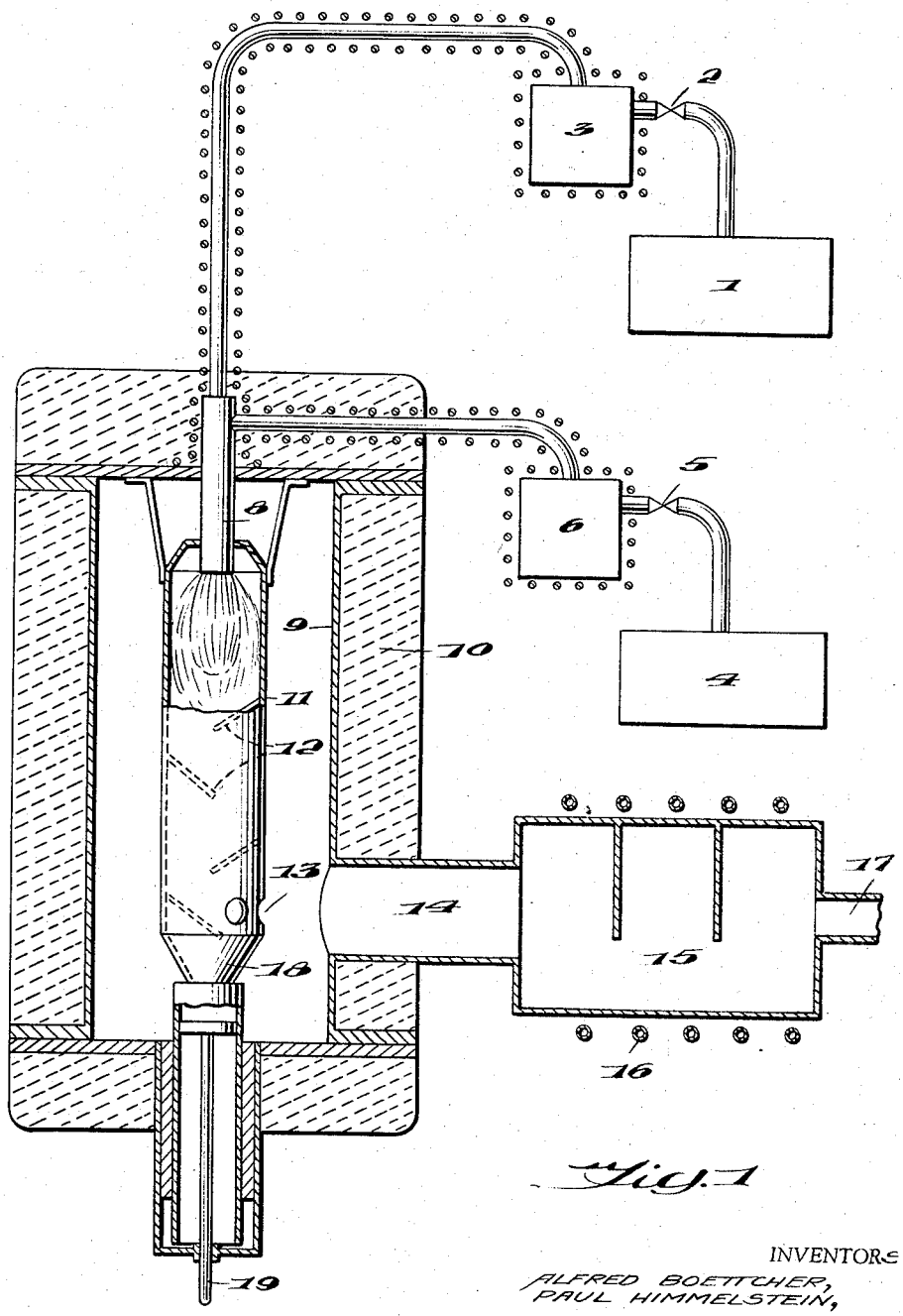

Jan. 20, 1959  A. BOETTCHER ET AL  2,870,007
PROCESS FOR THE PRODUCTION OF METALS BY REDUCTION
OF THEIR COMPOUNDS IN THE VAPOR PHASE

Filed March 3, 1955  3 Sheets-Sheet 1

INVENTORS
ALFRED BOETTCHER,
PAUL HIMMELSTEIN,

BY
Bailey Stephens and Huettig
ATTORNEYS

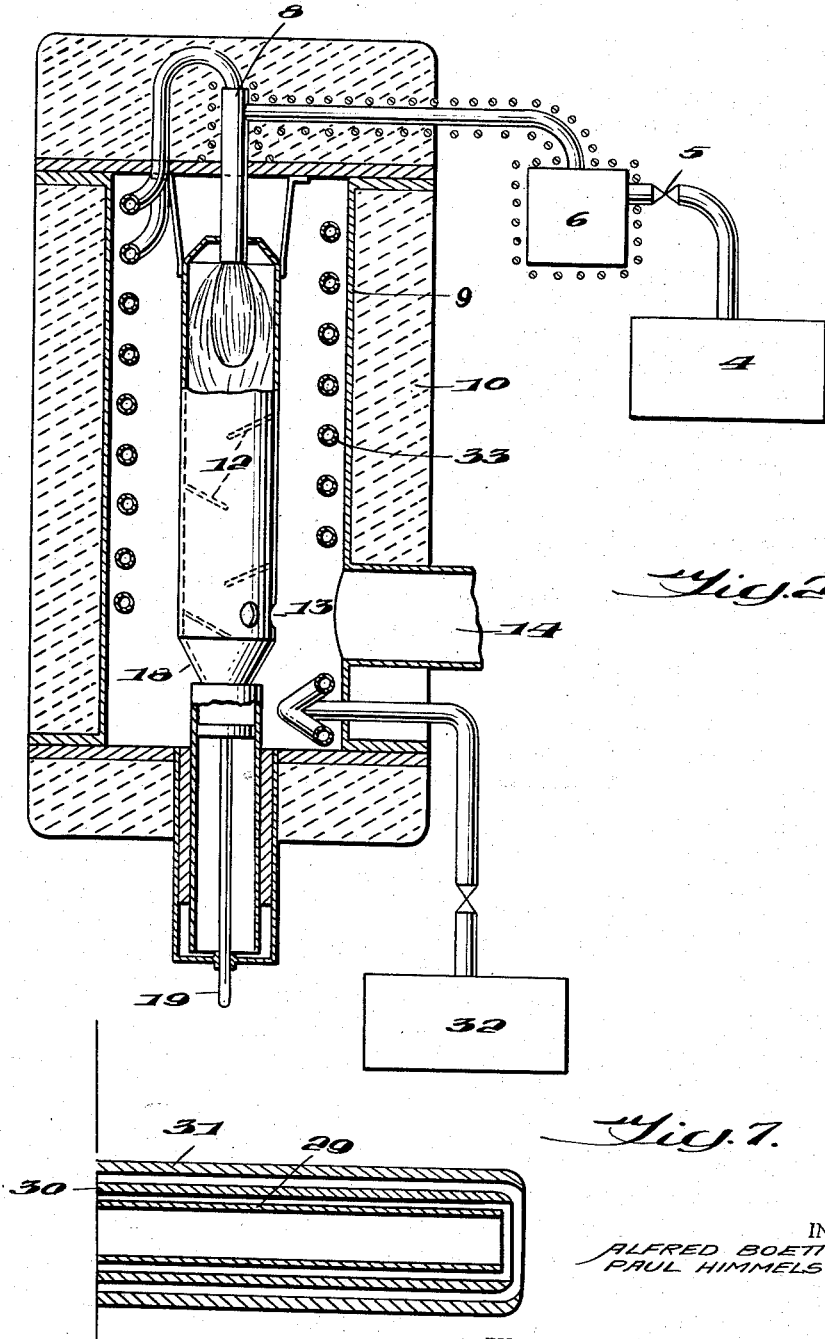

Jan. 20, 1959  A. BOETTCHER ET AL  2,870,007
PROCESS FOR THE PRODUCTION OF METALS BY REDUCTION
OF THEIR COMPOUNDS IN THE VAPOR PHASE
Filed March 3, 1955  3 Sheets-Sheet 3
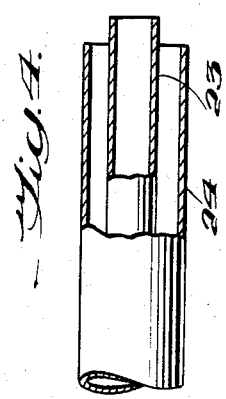
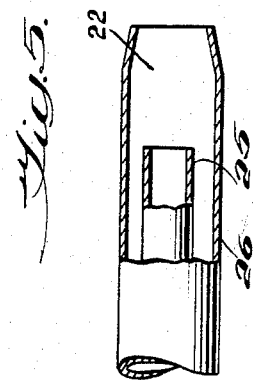
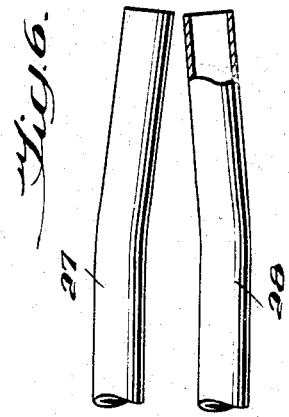
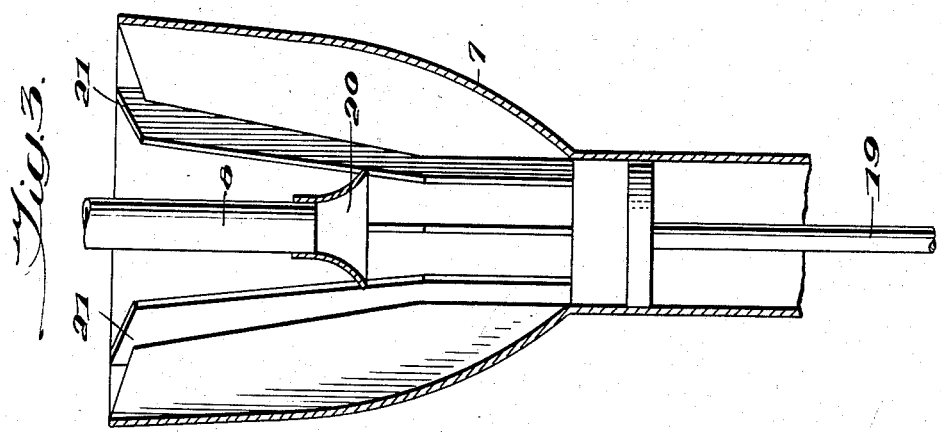
INVENTORS
ALFRED BOETTCHER
PAUL HIMMELSTEIN
BY Bailey, Stephens and Huettig
ATTORNEYS

United States Patent Office 2,870,007
Patented Jan. 20, 1959

2,870,007

PROCESS FOR THE PRODUCTION OF METALS BY REDUCTION OF THEIR COMPOUNDS IN THE VAPOR PHASE

Alfred Boettcher, Hanau am Main, and Paul Himmelstein, Frankfurt am Main, Germany, assignors to Deutsche Gold- und Silber-Scheideanstalt vormals Roessler, Frankfurt am Main, Germany Application March 3, 1955, Serial No. 491,938

Claims priority, application Germany July 17, 1952

3 Claims. (Cl. 75—84.5)

The present invention relates to a process for the production of metals by reduction of their compounds, especially their halides, in which the metal compound to be reduced and the reducing agent employed are burned in the vapor phase in a directed flame.

This application is a continuation-in-part of our copending application Serial No. 366,797, filed July 8, 1953, now abandoned.

In the production of metals, especially titanium and zirconium, which have a high affinity for oxygen and are consequently difficult to reduce from their halides, especially their chlorides, it was usually recommended that the reduction be effected with liquid sodium or magnesium. The metal produced thereby usually is in the form of a loose spongy mass and must be purified in a number of troublesome procedures and finally melted to a compact form under high vacuum or a protective gas. Such multistep processes are in most instances subject to a number of disadvantages. One of the primary difficulties encountered arises because the highly porous very sensitive crude product tends to undergo surface oxidation during the individual steps of the purification process and the resulting oxidic portions can only be removed with great difficulty or not at all during the subsequent manipulative steps of the process. It is also of note that in most of the practical modifications of the previously known processes it was necessary to carry them out discontinuously.

It is an object of the present invention to provide a single step process which can be carried out continuously in which the metal produced can solidify directly in compact form from the fused product whereby contamination of the metal with oxygen and other reactive substances can be successfully avoided.

In accordance with the invention, both reaction components, that is, the compound to be reduced and the reducing agent are reacted in the vapor phase in a directed flame under the exclusion of air or other deleterious gases while preventing the formation of a liquid phase of the reactants in the reaction zone. The metal obtained can, depending upon the conditions employed, be in the form of a very pure dense sintered product or in a compact reguline form.

The process according to the invention is advantageously adapted for the reduction of halides, especially chlorides, of such metals in which the absolute value of the heat of formation per halogen ion is not above 70 kcal./mol. Therefore, halides of silicon, vanadium, tungsten, molybdenum, chromium, uranium, hafnium, thorium and especially of titanium and zirconium come into consideration as their reduction proceeds with the release of a large quantity of heat.

The alkali and alkaline earth metals such as sodium and magnesium, because of their high affinity for halogen, are adapted for use as the reducing agent employed in the process according to the invention. The alkali metals, particularly sodium, are especially adapted therefor because of their high vapor pressures at relatively low temperatures.

In carrying out the process according to the invention, vapors of both reaction components, for example, titanium chloride and sodium, are introduced into an evacuated reaction space either in the form of a directed stream containing such components in intimate admixture or in the form of closely adjacent directed streams and ignited to form a directed flame. The reaction components are preferentially supplied to the reaction chamber in substantially undiluted form, that is, containing at most less than 10% of foreign gases or vapors, so that substantially only the reaction components and products of the reaction are present in the reaction space. This not only increases the output achieved, but also prevents dissipation of any of the heat of reaction for heating extraneous materials not involved in the reaction. It was furthermore found that when the reaction components are introduced in the manner described above so that a constricted directed flame is formed, it is possible to maintain a continuous flame once it has been ignited without supplying any further external heat, other than that incidentally introduced with the vaporized reaction components. The heat required to ignite the flame and initiate the reaction can be supplied either by superheating one or both of the reaction components or by impinging the vaporized reaction components against a heated surface until the flame is ignited and the reaction becomes self sustaining through the heat of reaction released. It is also possible to employ an electric arc for this purpose.

In order to precipitate the pure metal formed in the process according to the invention a depositing or collecting surface is provided upon which the flame in which the reduction is carried out impinges, which in accordance with one modification of the process according to the invention, is concave to provide an intimate contact with the entire front of the flame in which the reduction is carried out. The temperature of the depositing surface must in every instance be below the boiling point of the metal produced but above the boiling point of the other products of reaction, for example, NaCl, and depending upon the form the metal is to be produced can be held either slightly above or slightly below the melting point of the metal produced. In the latter instance, metal is deposited in a more or less sintered form, whereas in the former instance, the metal is obtained in compact reguline form. The use of a depositing surface maintained above the melting point of the metal produced is preferred, as in such case no further treatment is required to obtain the metal in compact reguline form than permitting it to solidify.

A particularly advantageous modification of the invention is one in which heat is withdrawn from the depositing element at a rate just sufficient to maintain a thin layer of the metal deposited thereon in liquid form, whereas the previously deposited metal is continuously permitted to solidify, so that only a surface layer of liquid metal remains facing the reaction chamber. By continuous gradual withdrawal of the depositing element and the solidified metal adhering thereto, the process can be carried out in the form of a continuous casting process. In such case care of course must be taken that no air or other harmful gases gain access to the reaction space as the metal is withdrawn therefrom.

It is not necessary that the process according to the invention be carried out in such a way that the metal formed is retained upon the depositing surface. For example, the metal formed can be deposited upon a highly refractory tubular element, for example, of tungsten in sufficiently liquid form that it will flow out of the reaction space and be collected in any desired manner.

The vaporized non-metallic reaction products which are produced during the process according to the invention are withdrawn from the reaction zone and condensed by cooling at a point remote from where the metal produced is collected.

It was found advantageous in accordance with a modification of the invention if the depositing element for the metal produced in the flame is in the shape of an extended tube which embraces the flame as closely as possible, such tube being closed or essentially closed at the end facing the burner nozzle, and containing one or more openings at the end remote from the burner nozzle through which the metal as well as the other reaction products produced can be removed from the reaction space within the tube. Unexpectedly, it was found that, even with reactions evolving a large quantity of heat, the reaction in the flame is spatially so confined that the close confinement of the flame with the depositing surfaces of the extended tube does not endanger the functioning of such surfaces and such surfaces can collect the metal produced and guide such metal together with the vaporous other products produced, such as, sodium chloride, out of the actual reaction zone. This modification of the invention renders it possible to control the thermal conditions of the reaction closely and also to utilize the heat of reaction to such an extent that additional heating of the reaction space can be dispensed with. A further advantage is that, in view of the extended concurrent guiding of the metal and sodium chloride produced, a better separation of the reaction products is possible and losses of the metal as vapor or dust can be substantially or completely avoided.

It was also found that when the elongated tube enveloping the directed flame was employed it was possible to provide a narrow space between the burner nozzle and the depositing element to prevent too great a heat transfer from the depositing element to the burner nozzle without causing a tendency for the vaporized reaction products to escape through the opening provided thereby. If desired, this space can be bridged in several spots, for example, by spot welding to provide an effective joint between the nozzle and the depositing element without providing too great a path for heat transfer.

Preferably, the tubular depositing element is housed within an insulated container in such a way that it is spaced from the inner walls of such container. With such a construction it is possible to utilize the heat produced by the reaction between the reducible metal compound and the reducing agent to preheat or even vaporize the reactants, preferably, the reducing agent, such as, sodium. For example, a heat exchange coil can be provided in the space between the tubular depositing element and the insulated housing and melted sodium which is to be employed as the reducing agent can be passed through such coil before it is supplied to the burner nozzle. If the heat produced by the reaction in question is insufficient to effect evaporation of the sodium during its passage through the coil, the sodium is passed through an evaporator before it is supplied to the burner nozzle. However, in many instances the heat of reaction suffices to evaporate the sodium so that the heat exchange coil can be connected directly with the nozzle. It is of course not necessary to provide a special heat exchange coil in the space between the tubular depositing element and the insulated housing, if such space is adapted to permit direct introduction into and withdrawal of the sodium from such space.

In a similar manner the liquid reducing agent can also be employed to cool the burner nozzle to prevent premature initiation of the reaction therein. In such case, for example, melted sodium can first be passed through a cooling coil surrounding the nozzle before it is passed to the evaporator or the heat exchange coil as described above. Care however must be taken in cooling the burner nozzle that the reactants are supplied therethrough to the flame only in vaporized form.

A number of forms of apparatus can be employed for carrying out the process according to the invention. It is essential, however, that they be such that the reduction is carried out with the exclusion of air or other gases capable of reacting with the reaction components. Preferably the process is carried out under vacuum. The introduction of the vaporized reaction components into the reaction zone is effected with nozzles to provide the desired compact directed stream of small cross-section so that steep drop in partial pressure in the radial direction can be provided. Advantageously the vaporized reaction components are introduced through concentrically arranged nozzles. In order to ensure a quick and uniform progress of the reaction, it is in some instances advisable to provide for an intensive mixing of the reaction components supplied in separate streams just before they react, by, for example, providing a mixing chamber in which turbulent mixing of the individual streams of the vaporized reaction components takes place before they reach the reaction zone. It is, of course, necessary when such a mixing chamber is provided, that the temperature and velocity of the gas streams be adjusted so that the reaction essentially only occurs after the gas stream leaves the mixing chamber.

When concentric nozzles are employed to supply the vapors of the metal halide to be reduced and the reducing metal there may be some tendency in continued operation of the process that the high heat of reaction will cause premature reduction of the metal halide so that some of the metal produced deposits on the nozzles. It was found that such deposit caused by premature reduction of the metal halide can be prevented by suitable adjustment of the concentric nozzle cross-sections within certain limits. Accordingly the cross-section of each of the concentric nozzles is adjusted so that the ratio by weight of reducible metal compound, for example, titanium chloride, to the reducing metal, for example, sodium, is 6 to 20:1 per mm.$^2$ cross-section of the entire nozzle per second and also that the quantity of reducing metal, such as, sodium, supplied through its nozzle is at least 2 milligrams per second per mm.$^2$ nozzle cross-section. It was found that in this manner the undesired and dangerous clogging of the nozzle openings with deposited reduced metal could be avoided with certainty. This is of substantial importance in continuous operation of the process.

It was also found advantageous if the reaction components are supplied to the flame at different velocities in that the component, for example, titanium chloride, supplied through the inner tube has a velocity which is at least 10% greater than the velocity of the component, for example, soduim, supplied through the outer tube. It is inconsequential whether the reducible metal compound be supplied through the inner or outer tube of the concentrically disposed nozzles. Advantageously the difference in velocities can amount even to 30%.

It was also found advantageous, if the concentric nozzles employed are not provided with a mixing chamber, to supply at least one of the reaction components to the nozzle with sufficient velocity to engender turbulent flow. Unexpectedly it was found that this would not substantially reduce the desired concentration of the reaction within the flame but on the other hand caused an excellent mixing of the reaction components to produce a better yield of reduced metal.

In accordance with another modification of the invention the concentric streams of the reaction components leaving the nozzle are separated by a blanket of inert gas, such as, argon, until they are spaced from the end of the nozzle so as to prevent premature reaction in contact with the end of the nozzle. The blanketing inert gas, such as, argon, is preferably supplied through the nozzle at a pressure not exceeding 20 Torr. In such instance, the nozzle employed preferably consists of three concentric tubes, one reactant vapor being supplied through the inner tube, the inert gas being supplied through the space between the inner tube and the intermediate tube and the other reactant vapor being supplied through the space between the intermediate and the outer tubes.

The accompanying drawings illustrate several modifications of apparatus suitable for carrying out the process according to the invention.

In the drawings:

Fig. 1 diagrammatically shows one form of an apparatus for carrying out the process according to the invention;

Fig. 2 diagrammatically shows another form of an apparatus for carrying out the process according to the invention;

Fig. 3 diagrammatically shows a modified form of a collecting element for the metal formed in the process according to the invention; and Figs. 4 through 7 show several preferred forms of nozzles for introducing the stream or streams of the vapors of the reaction components into the apparatus for carrying out the process according to the invention.

In Fig. 1, a shell 9 of a heat resisting steel such as chromium nickel steel or a nickel chromium alloy is provided with highly refractory insulating material 10 to reduce the loss of heat from the chamber within such shell. A burner nozzle 8 is provided in the upper end of such chamber opening into tube 11 provided with baffles 12 of a highly refractory material such as tungsten. Tube 11 and baffles 12 serve to collect the metal formed in the flame issuing from nozzle 8. The vaporized reaction components, for example, titanium chloride and sodium, are supplied to nozzle 8 which consists of two concentric tubes over heated conduits from vaporizers 3 and 6. Vaporizers 3 and 6 are supplied with regulated amounts of liquid reaction components from vessels 1 and 4 with the aid of regulating valves 2 and 5.

The metal formed in the flame issuing from nozzle 8, for example, titanium, is deposited in liquid form on the interior of tube 11 and baffles 12 associated therewith and, as the tube is maintained above the melting point of titanium by the heat of reaction the titanium runs out of the opening 18 at the bottom of the tube 11 collects upon piston 19 where it gradually solidifies and can be withdrawn by lowering such piston at an appropriate regulated rate.

The sodium chloride formed during the reaction leaves tube 11 in vaporized form through openings 13 and is pumped off through conduit 14 into condenser 15 by pump line 17. Pipes 16 serve to cool condenser 15.

Fig. 2 shows a modified form of the apparatus shown in Fig. 1 and the identical parts thereof are identified by the same reference numerals. In the modified form of the apparatus shown in Fig. 2 a heat exchange coil 33 is provided in the space between tube 11 and insulated shell 9 in which the liquid reducing agent employed for the reaction, for example, sodium, is heated and evaporated before it is supplied to nozzle 8. The sodium in melted form is supplied to heat exchange coil 33 from vessel 32.

Fig. 3 shows a modified form of a collecting surface for the metal formed in the flame issuing from burner nozzle 8. In this instance the collecting element 7 is concave in form to conform essentially to the shape of the flame issuing from nozzle 8. Guide plates 21 are provided in the interior of collecting element 7 to guide the vaporized sodium chloride formed out of the reaction zone. A funnel shaped element 20 is also provided adjacent the nozzle 8 to assist in preventing the sodium chloride vapors leaving the upper end of collecting element 7 from being drawn back into the flame. In using this modification of collecting surface the flame issuing from nozzle 8 is adjusted so that the metal collected thereon as well as to a certain extent on guide plates 21 remains in liquid form and can run off to collect over piston 19 where it gradually solidifies and can be withdrawn by lowering such piston at a rate substantially equal to the rate at which the metal is collected.

Figs. 4 and 5 show preferred forms of burner nozzles employed according to the invention in which the tubes supplying the vaporized reaction components are arranged concentrically. In each instance the vaporized metal compound to be reduced is supplied through the inner tube while the vaporized reducing agent is supplied through the outer tube. In the modification shown in Fig. 4, inner tube 23 is somewhat longer than outer tube 24 so that the reaction components supplied therethrough do not mix before they issue from the nozzle. In the modification shown in Fig. 5, inner tube 25 terminates inside of outer tube 26 to provide a mixing chamber 22 in the nozzle in which the vaporized reaction components are intimately mixed before they issue from the nozzle.

Fig. 6 shows a burner modification in which separate converging tubes 27 and 28 are provided to produce the desired directed flame of constricted cross-section.

Fig. 7 shows a burner nozzle modification in which the nozzle contains 3 concentric tubes 29, 30 and 31 to permit separation of the streams of reducible compound, such as, titanium chloride, and the reducing compound, such as, sodium, by a blanket of inert gas, for example, argon, until they have passed beyond the end of the nozzle by, for example, passing the reducible compound through tube 29, passing the inert gas through the space between tubes 29 and 30 and passing the reducing agent through the space between tubes 30 and 31.

The following examples will serve to illustrate the process according to the invention in the production of titanium in an apparatus according to the invention:

*Example 1*

Before initiating the reaction, the apparatus (Fig. 1) was evacuated by a pump connected to line 17, and thereupon liquid sodium was permitted to be drawn into evaporator 6 over valve 5 from container 4 and titanium chloride was permitted to be drawn into evaporator 3 from container 1 over valve 2. Evaporator 6 was maintained at a temperature of 800° C. and evaporator 3 at a temperature of at least 110° C. so that the vapor pressure of the reaction component amounted to at least 300 Torr. (1 Torr.=1 mm. Hg). The supply conduits as well as the burner nozzle itself were heated to a temperature of 810° C. to ensure that condensation of the reaction components did not occur. The stream of vaporized sodium and titanium tetrachloride issuing from nozzle 8 was ignited and then permitted to burn in a flame. The quantity of sodium and titanium tetrachloride supplied to the flame was respectively 1 mol and 0.25 mol per second and about 4 kg. of pure titanium was formed per hour. The temperature within the reaction vessel was about 1750° C. About 50% of the heat of reaction was used to maintain such temperature, whereas the remaining heat of reaction served to compensate for the heat losses from the reaction vessel and rendered it possible to maintain the reaction easily without supplying heat from an external source once the reaction had been initiated.

*Example 2*

In carrying out the reaction according to the invention the nozzle is formed of two concentric tubes, the inner tube having a cross section of 20 mm.² and being supplied with vapor of $TiCl_4$ whilst the stream of vaporized sodium is leaving through the ring valve, the latter encasing the inner tube and having a cross section of 75 mm.². The output per second amounts to 0.048 mol, i. e. 1.1 grs. of Na and 0.012 mol, i. e. 2.3 grs. of $TiCl_4$. The specific charge of the nozzle therefore amounts to 15 mg./mm.² with sodium and 115 mg./mm.² with titanium tetrachloride. The quantity of vapor produced per second in the evaporators at a pressure of 300 Torr. amounts to 11 liters of vapor of Na and 1.1 liters of vapor of TiCl$_4$. As the vapor volume depends on the density and the pressure, the latter decreasing to zero from the evaporators to the reaction vessel, the use of an adequate resistance to flow in the steam conduits enables the outflow of the vapor of TiCl$_4$ at an increased velocity and a lower density than the outflow of the vapor of Na. The vapor pressure of the reaction products (Ti and NaCl) is considerably lower than the vapor pressure of the starting materials, thus preventing a damming before the nozzle. The thus formed Ti is immediately separated, whilst the NaCl leaves the hot reaction zone through sufficient large openings either in a liquid or in a vaporous phase.

While the process according to the invention has been described with particular reference to the production of titanium, it is also especially suited for the production of zirconium as well as for the production of such other metals, the halides of which, as described above, have an absolute value of formation enthalpy per halogen ion, which is not greater than 70 kcal./mol. The process according to the invention is also applicable to the production of pure metal mixtures or alloys by simultaneous reduction of a plurality of metal compounds.

We claim:

1. In a process for the production of titanium by reduction of halides thereof in the vapor phase, the steps which comprise introducing the titanium halide to be reduced in the vapor phase and sodium as a reducing metal therefor in the vapor phase into a reaction chamber in constricted directed concentric streams from concentrically disposed nozzles, the velocity of the reactant introduced through the inner nozzle being at least 10% greater than that of the reaction component introduced through the outer nozzle, while avoiding the formation of a liquid phase of such reactants, the titanium halide to be reduced being a halide whose absolute heat of formation per halogen ion is not greater than 70 kcal./mol., the quantity of the sodium introduced being at least 2 milligrams per second per mm.$^2$ reducing metal nozzle cross-section and the quantity by weight of titanium halide to be reduced introduced per second per mm.$^2$ total nozzle cross-section is 6 to 20 times the quantity by weight of sodium introduced, igniting such streams to form a continuously burning directed restricted flame in which the titanium halide reduces to titanium and the sodium is converted to its halide, and impinging said flame upon a collecting surface maintained below the boiling point of titanium and above the boiling point of the sodium halide produced in such flame to collect the titanium produced.

2. The process of claim 1 in which the velocity of the reaction component introduced through the inner nozzle is at least 30% greater than the velocity of the reaction component introduced through the outer nozzle.

3. The process of claim 1 in which said titanium halide is titanium tetrachloride.

References Cited in the file of this patent

UNITED STATES PATENTS

| Number | Name | Date |
|---|---|---|
| 1,046,043 | Weintraub | Dec. 3, 1912 |
| 1,306,568 | Weintraub | June 10, 1919 |
| 1,536,176 | Aldrich | May 15, 1925 |
| 2,205,854 | Kroll | June 25, 1940 |
| 2,270,502 | Bucher | Jan. 20, 1942 |
| 2,556,763 | Maddex | June 12, 1951 |
| 2,564,337 | Maddex | Aug. 14, 1951 |
| 2,607,674 | Winter | Aug. 19, 1952 |
| 2,618,549 | Glasser et al. | Nov. 18, 1952 |
| 2,647,826 | Jordan | Aug. 4, 1953 |
| 2,708,158 | Smith | May 10, 1955 |
| 2,760,858 | Findlay et al. | Aug. 28, 1956 |
| 2,762,093 | Hood | Sept. 11, 1956 |
| 2,766,111 | Singleton | Oct. 9, 1956 |
| 2,782,118 | Hood | Feb. 19, 1957 |

FOREIGN PATENTS

| Number | Country | Date |
|---|---|---|
| 253,161 | Great Britain | June 7, 1926 |
| 386,621 | Great Britain | Feb. 16, 1933 |
| 827,315 | France | Jan. 24, 1938 |
| 1,072,586 | France | Mar. 17, 1954 |
| 1,088,006 | France | Sept. 1, 1954 |
| 296,867 | Germany | Mar. 13, 1917 |
| 505,801 | Belgium | Sept. 29, 1951 |

OTHER REFERENCES

Transaction of the Faraday Society, vol. 32, 1936, pages 633–642.

Handbook of Chemistry and Physics, 26th ed., 1942 by Hodgman et al., pp. 1409.